March 24, 1953 — I. H. POLK — 2,632,312
VERTICAL PRESSURE PLATE FOOD FREEZING MACHINE
Filed Feb. 16, 1948 — 4 Sheets-Sheet 1

INVENTOR
ISAAC H. POLK
BY
Mason & Thomas
ATTORNEYS

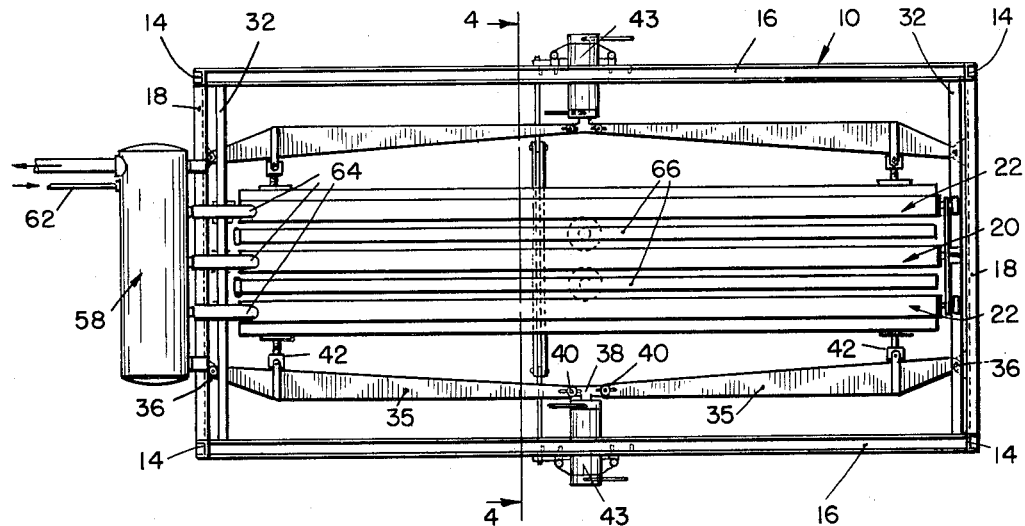
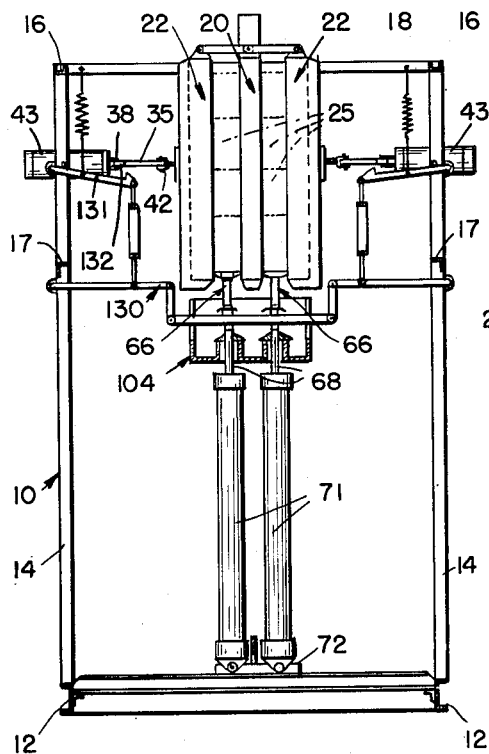
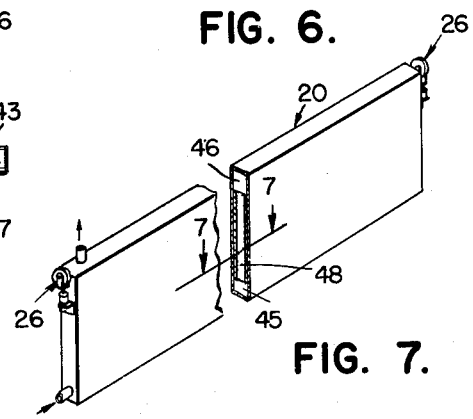
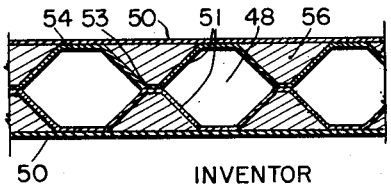

March 24, 1953     I. H. POLK     2,632,312
VERTICAL PRESSURE PLATE FOOD FREEZING MACHINE
Filed Feb. 16, 1948     4 Sheets-Sheet 3
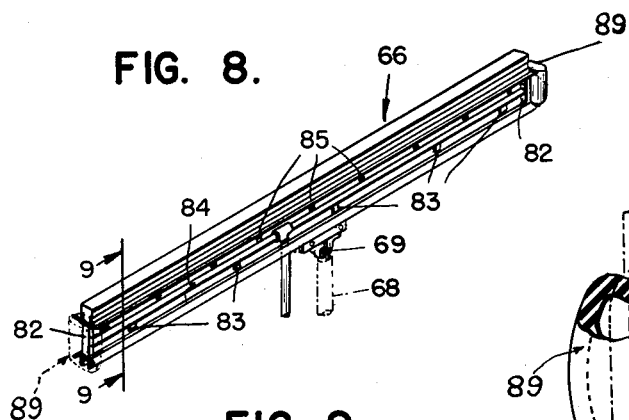
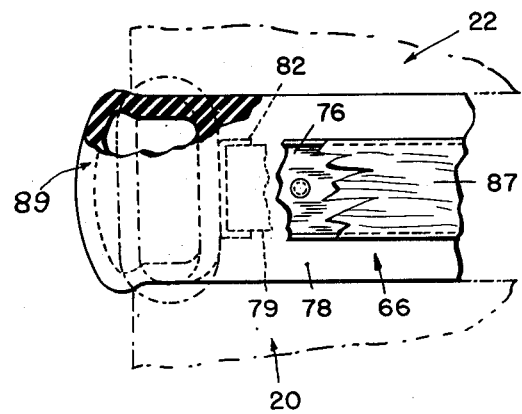
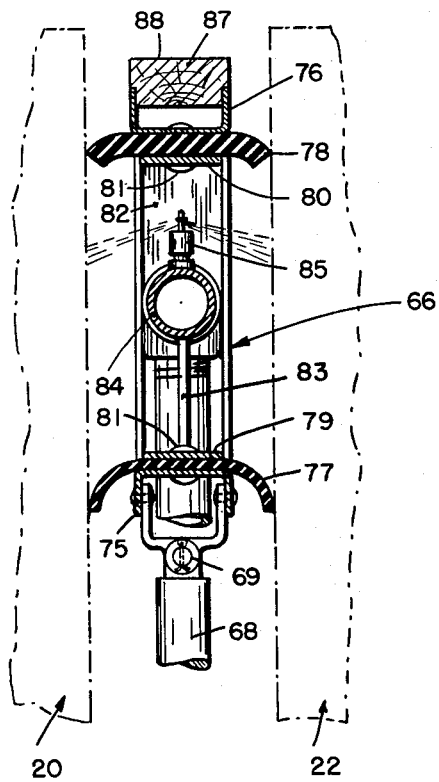
INVENTOR
ISAAC H. POLK
BY
*Marcus & Graham*
ATTORNEYS March 24, 1953 I. H. POLK 2,632,312
VERTICAL PRESSURE PLATE FOOD FREEZING MACHINE
Filed Feb. 16, 1948 4 Sheets-Sheet 4

INVENTOR
ISAAC H. POLK
BY
Mason & Graham
ATTORNEYS

Patented Mar. 24, 1953

2,632,312

UNITED STATES PATENT OFFICE 2,632,312

VERTICAL PRESSURE PLATE FOOD FREEZING MACHINE

Isaac H. Polk, San Jose, Calif.

Application February 16, 1948, Serial No. 8,553

12 Claims. (Cl. 62—114)

This invention has to do with apparatus and methods for the quick or sharp freezing of food, particularly food that is packaged in paper cartons or containers before it is frozen.

Ordinarily, food in paper packages is frozen by conduction with the packages disposed in contact with refrigerated surfaces, in order to guard against penetration of the permeable container as might take place were the packages subjected to a brine spray or bath to freeze the contents. In the preservation of comestibles in containers it is necessary to provide an air or vacuum space in the container to allow for expansion of the comestibles which occurs during freezing. This air or vacuum materially retards heat transfer when it is interposed between the conduction surfaces and the product, since air or a vacuum is a very poor heat conductor. Moreover, it is well known that the thickness of a substance to be frozen determines the time required to completely solidify such substance, with all other factors equal, and the time required to freeze a substance varies approximately as the square of the thickness of such substance, all other factors remaining constant.

In my copending application for patent for Tunnel Freezing Apparatus and Method, filed August 21, 1946, Serial No. 691,962, I disclose vertically disposed freezing surfaces permitting the packages to be so arranged with respect to the force of gravity and the freezing surfaces that no air or vacuum is interposed between the product and the conduction surfaces, thereby increasing the rate of heat transfer, increasing the area of conductive contact, and reducing the thickness of the material to be frozen to a minimum. An important object of this invention is to provide improved apparatus for accomplishing this.

Present apparatus in commercial use, with which I am familiar, has several disadvantages. A major disadvantage or difficulty with such apparatus is the fact that it is impossible therewith to so dispose the packages to be frozen with respect to the force of gravity and the conduction surfaces as to obtain maximum heat transfer. Another disadvantage with present apparatus is the tendency of the packages to adhere or freeze to the conduction surfaces due to the presence of ice or frost thereon, with the result that the packages must be broken loose after the freezing cycle. This continually results in rupture of an appreciable percentage of the packages, causing loss of food and loss of time and labor required to clear the apparatus. Another disadvantage in present apparatus is the fact that since packages tend to adhere to the conduction surfaces when any ice or frost is present, and since ice serves as insulation when disposed between the packages and conduction surfaces, it is necessary, periodically, to defrost the machine, with a consequent loss of production. Another disadvantage of present apparatus is the difficulty presented by the fact that the design of present apparatus precludes the application of automatic loading and unloading of the packages.

An object of this invention is to provide novel apparatus for the sharp freezing of packaged food by conduction freezing through intimate contact of the packages with refrigerated, highly heat conductive surfaces which obviates the particular disadvantages of present apparatus noted above. A particular object is to provide apparatus of this type in which the refrigerated surfaces are vertically arranged and the packages are maintained in intimate pressure engagement therewith during the freezing cycle. In this connection, it is an object to provide apparatus which allows for any expansion of the product within the container during freezing while maintaining the plates in sufficient pressure engagement therewith to insure maximum heat transfer without distortion of the container.

Another object is to provide a new and improved conduction or freezing plate construction which enables the use of the so-called flooded system of refrigeration with the plates forming the evaporator for the system. A particular object is to provide a plate with refrigerant header passages along opposite edges and a plurality of connecting passages therebetween whereby, when the plate is vertically disposed with one header passage at the upper edge and the other at the lower, the lower passage may be used as an inlet header to feed the connecting vertical passages and the other as an outlet header to conduct fluid away from the vertical passages.

A further object of the invention is to provide a method and apparatus for conditioning the conduction surfaces to minimize and substantially prevent the formation of frost thereon with the consequent freezing of the packages thereto and to remove any ice or frost that may form on the surfaces. A particular object is the provision of a machine embodying vertically disposed freezing plates between which the packages of food are placed to freeze them in which means is provided for periodically applying anti-icing fluid to the surfaces of the plates between freezing cycles without raising the temperature of the plates.

Another object is to provide, in a machine having laterally spaced vertically disposed freezing plates, movable means for loading and unloading the packages of food and for simultaneously applying an anti-icing fluid to and shortly thereafter removing it from the plates. A further object is the provision of an anti-icing fluid applicator means designed to apply and evenly spread the fluid on the surfaces of the plates in one motion and to thereafter remove the fluid in a second motion, the applicator also being designed to act as an elevator for charging the machine with packages and discharging packages therefrom. A still further object is to provide such an applicator which entirely encloses the anti-icing fluid and the plate area during application of the fluid, thereby preventing contamination of the packaged food.

Another object of the invention is to provide, in a machine of the type indicated, a fluid pressure operated means for moving the plates laterally into pressure engagement with food packages between the plates, for maintaining the plates in pressure engagement with the packages during the freezing cycle, and for moving the plates away from the packages in coordination with a vertically movable elevator for removing the packages from the machine. It is a particular object to provide means to coordinate the movement of the elevator and plates during discharge of the food packages through a fluid pressure system in such a way that the movement of these parts is dependent upon the resistance to movement thereof caused by the packages, whereby any packages which may adhere to the plates may be safely loosened for discharge.

A further object is the provision of a flexible suspension means for the plates in combination with a package elevator and means for laterally moving the plates whereby limited vertical independent movement of the plates is permitted during unloading of the machine to assist in rupturing any adhesions that may exist between the plates and packages.

These and other objects will be apparent from the drawings and the following description thereof. In the drawings:

Fig. 3 is a plan view of the machine of Fig. 1;

Fig. 4 is a section on line 4—4 of Fig. 3;

Fig. 6 is a perspective view, partly broken away, of a refrigerant plate;

Fig. 7 is a fragmentary sectional view on line 7—7 of Fig. 6;

Fig. 8 is a perspective view of an anti-icing fluid applicator member;

Fig. 9 is an enlarged sectional view on line 9—9 of Fig. 8;

Fig. 10 is an enlarged fragmentary plan view of one of the refrigerant plates and showing the end seal;

Figure 1:
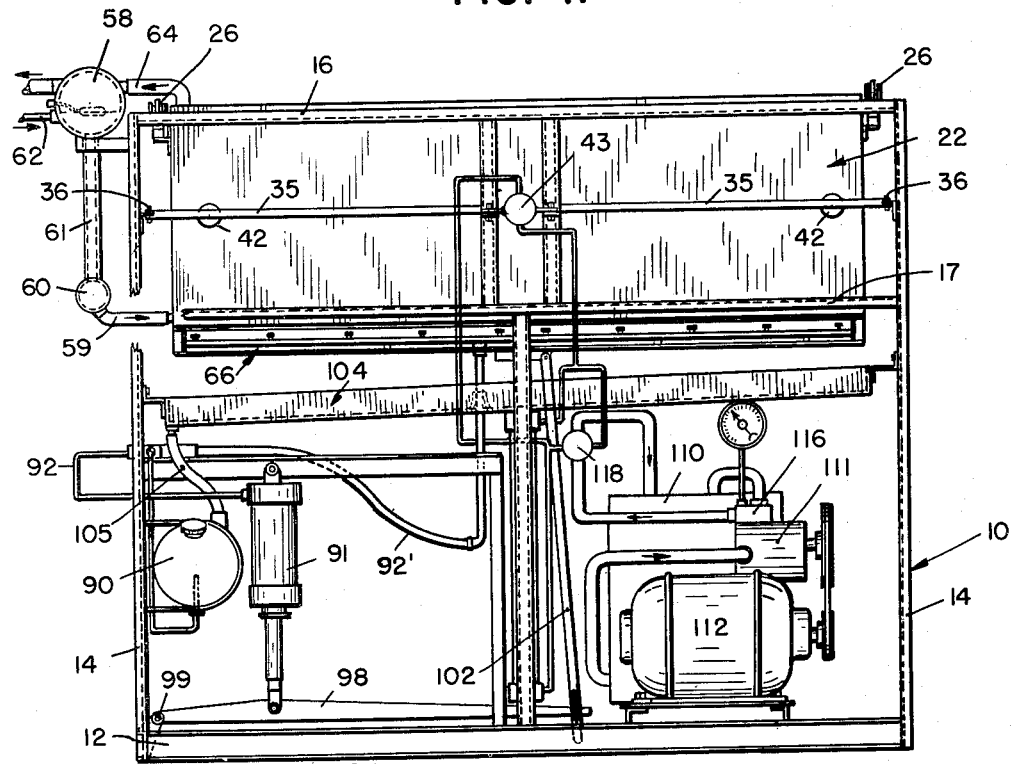
Fig. 1 is a side elevational view of a machine embodying the invention.
Figure 2:
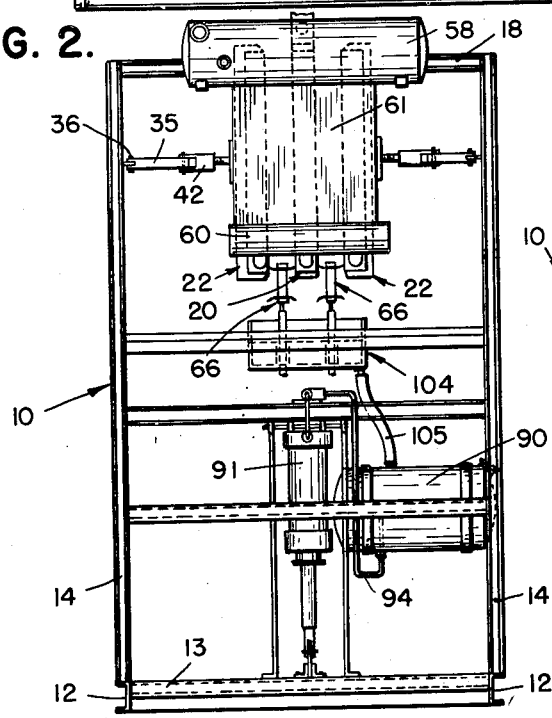
Fig. 2 is an end elevational view of the machine of Fig. 1, the view being on line 2—2 of Fig. 1.

More particularly describing the invention, reference numeral 10 generally indicates the frame of a machine embodying the invention. The frame may include longitudinal base channels 12 and suitable cross members 13. Extending upwardly from the base are four corner posts 14 which support longitudinal upper rails 16, intermediate rails 17, and any suitable number of cross members, including the two upper end cross members 18.

Suspended from the frame are what will be termed conduction freezing plates consisting of a central or inner plate 20 and outer plates 22. For simplicity of illustration only three plates are shown; however, it will be understood that any desired number of plates may be provided in a given machine. The outer plates are provided with a layer 23 of heat insulation which covers the outer sides and the edges of the plates. The edges of the inner plate may also be covered with insulation, indicated by 23'.

Briefly, as will later appear, rectangularly shaped packages of food 25 (Fig. 4) are placed between the plates with their least dimension at right angles to the plates, after which the plates are caused to be moved laterally into pressure engagement with the packages therebetween. Pressure is maintained on the packages during freezing of the contents. Subsequently, the packages are removed and the machine reloaded.

Figure 5:
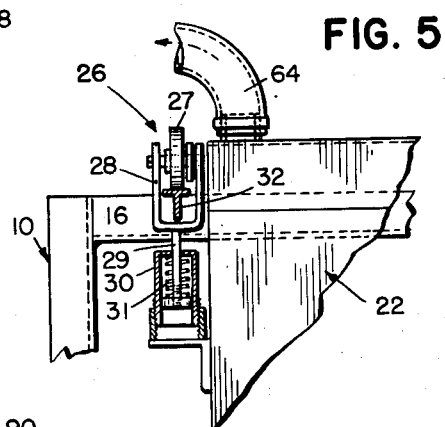
Fig. 5 is an enlarged view of the upper end portion of one plate showing the suspension means therefor.

Preferably, the freezing plates are resiliently suspended from the frame in a manner to permit limited individual vertical movement thereof in order to assist in rupturing any adhesions which may form between the packages and the plates during the freezing cycle. In the form of the invention illustrated, the plates are provided with a suspension means at each end generally indicated by numeral 26 (Fig. 5). This means includes a roller 27 mounted in hanger 28 terminating in a headed stem 29 received in a housing 30 mounted on the plate. A compression spring 31 is interposed between the headed end of the stem and the housing to bear the weight of the plate. The rollers 27 ride on rails 32 mounted on the longitudinally extending upper rails 16 of the frame.

It will be apparent that with this construction the plates are mounted for limited vertical movement and that they also may move laterally. Means are provided for limiting and controlling lateral movement of the outer plates 22. Referring particulary to Fig. 3, each of the outer plates is provided with a yoke assembly which comprises a pair of arms 35 pivotally mounted at their outer ends to the frame at 36. The inner ends of the arms are operatively attached to a piston 38 by a flexible connection 40. Intermediate their ends the arms are flexibly connected to adjustable posts 42 mounted on the plates. Cylinders 43 house the pistons 38, which are double acting, provision being made for selectively connecting the ends of the cylinders to a source of pressure fluid whereby the plates may be moved in or out. The movement of the plates laterally by this apparatus will be described later.

Referring to Figs. 6 and 7, which illustrate the construction of the plates, each plate consists of a body provided with a lower or inlet header passage 45 along its lower edge portion, an upper or outlet header passage 46 along its upper edge portion and a plurality of connecting passages 48 across the plate which extend vertically in the suspended plate. The plates are constructed of a highly heat conductive material, preferably metal. Various constructions may be used to provide the aforementioned headers and interconnecting passages; however, in the form of the invention shown, the plates each consist of an outer sheet metal skin 50 and an inner pair of regularly corrugated sheets 51 of less width than the plate defining the aforementioned connecting passages 48. The skin and corrugated sheets are secured together along the seams 53 and 54 in any suitable manner. The regions 56 are filled with a magnesium metal or other highly heat conductive material, which, together with the sheets 51, serve to define the headers 45 and 46.

By constructing the plates with a header along the bottom and another along the top connected by a plurality of vertically extending passages, the plates may be used as an evaporator in a flooded system of refrigeration, such as where ammonia is used. The lower header of each plate may be connected to a separator 58 by flexible tube 59 leading to a sub-header 60 fed by conduit 61. A pipe 62 feeds the separator from a source of liquid ammonia or other refrigerant supplied by a compressor, not shown. The upper header of each plate is connected to the upper end of the separator 58 through the medium of a flexible tube 64.

As previously indicated, one of the greatest difficulties in the commercial sharp freezing of food in paper cartons or packages by the conduction method is the tendency of the packages to freeze to the freezing surfaces with the result that it is difficult to automatically rupture the adhesions between the surface and the package without damaging the packages. Consequently, a large percentage of the packages are broken, and a considerable loss is incurred. The adhesions between the packages and the freezing surfaces are caused largely by the presence of moisture on the freezing surfaces, or on the packages.

It is a feature of this invention that between successive loadings of the machine the surfaces of the plates are conditioned to prevent, insofar as possible, any formation of ice or frost on the surfaces and to remove any frost or ice that may form thereon. In order to accomplish this, means are provided for applying an anti-icing fluid to the surfaces of the plates as the packages are removed from the machine and for substantially removing this fluid and any resulting melted ice or frost or slush as the machine is loaded with a new charge of packages.

This means includes what will be termed applicators 66, one being provided for each space between plates. The applicators are mounted at the upper ends of piston rods 68 by a connection 69 permitting limited universal movement of the parts. Piston rods 68 extend upwardly from double acting pistons 70 (Fig. 11) contained in cylinders 71 pivotally mounted on a base part 72 of the frame.

The applicators each comprise a framework supporting a pair of vertically spaced wipers and a fluid distributor pipe therebetween having a suitable spray heads. More particularly, each applicator includes a pair of vertically spaced channels 75 and 76, a pair of flexible wipers 77 and 78, and a pair of inner straps 79 and 80 secured to the respective channels by rivets 81 and serving to mount the wipers. Intermediate end uprights 82 connect and support the members 79 and 80 in spaced relation. Pedestals 83 serve to support a fluid distributor pipe 84 which is secured at its ends to uprights 82. This pipe is provided with a plurality of suitable spray heads 85. Mounted on the upper channel 76 is a member 87 providing a flat surface 88 which serves as a floor upon which the packages of food are supported during loading and unloading of the machine.

Means may be provided for sealing the ends of the wipers in the form of end closures 89 (Fig. 10) of tubular form joined to the wipers 77 and 78 and being of a flexible resilient material such as a rubber-like composition. These elements readily conform to the plates when the same are contracted as shown by the full line position of the elements in Fig. 10, the broken lines showing the normal position occupied when the plates are expanded.

The distributor pipe 84 is supplied with fluid from a reservoir 90 (Figs. 1 and 11) through the medium of a piston-cylinder pump 91 and tubing 92 including flexible section 92'. A tube 94 connects the reservoir and the pump and the tubes 92 and 94 are each provided with a check valve, indicated respectively by 95 and 96. The piston of the pump is connected to an applicator by a linkage which includes a lever 98 pivotally mounted on the frame at 99 and connected to the piston at 100. This lever is operated by a link 102 connecting an applicator and the lever. Upon downward movement of the applicator a charge of anti-icing fluid is drawn into the pump. This is discharged upon upward movement of the applicators. A trough 104 located under the plates serves to catch fluid and slush removed from the plates, a tube 105 leading from the trough to the supply reservoir 90.

Preferably the lower wiper (77) is made more flexible than the upper (78) so that, as the applicator rises and fluid is sprayed on the plate surfaces, the lower wiper will serve to evenly distribute the fluid without removing it from the plates. As the wiper moves down, the upper and stiffer wiper will substantially remove the fluid and any slush that may be present.

It is to be understood that any suitable anti-icing fluid having a freezing point below the temperature of the freezing plates may be used. Such fluids are usually highly volatile and thus have no appreciable effect of raising the temperature of the freezing plates when sprayed thereon.

Figure 11:
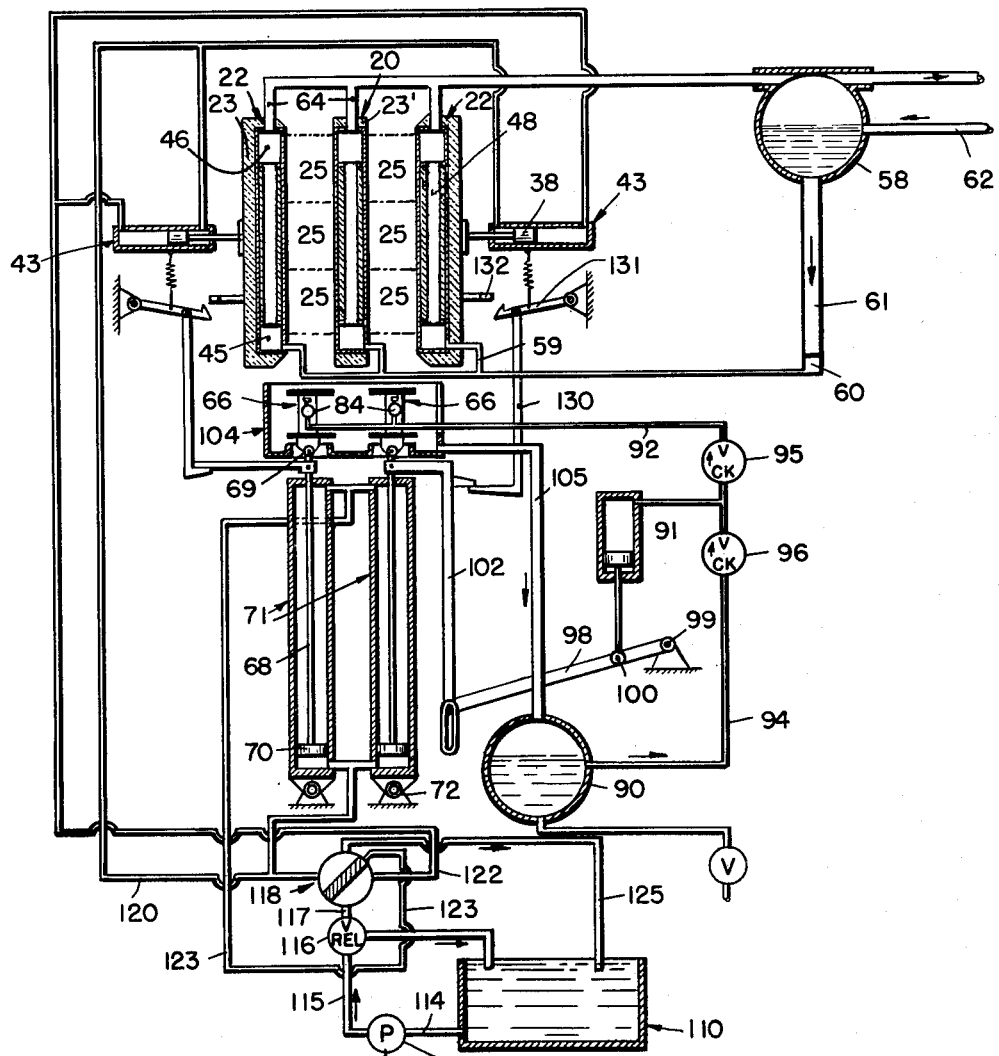
Fig. 11 is a schematic view of the apparatus.

Referring particularly to Fig. 11, the fluid pressure system for operating the applicator pistons 70 and the pistons 39 which causes lateral movement of the plates includes a reservoir 110 and a pump 111 which may be driven in any suitable manner by a motor 112. The pump is connected to the reservoir by an inlet pipe 114. On the discharge side of the pump, pipe 115 leads to a pressure regulator valve 116 which in turn is connected by pipe 117 to a five port valve 118. Leading from one port of the valve is tube 120 communicating with the inner ends of cylinders 43 and the lower ends of the applicator cylinders 71. On the opposite side of the valve is a tube 122 which connects with the outer ends of cylinders 43. Another tube, 123, leads from the valve to the upper ends of the applicator cylinders 71. A discharge line 125 leads from the fifth port to the reservoir.

Figures 12, 13:
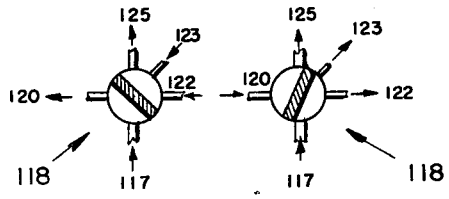
Fig. 12 is a schematic view of the control valve in one position.
Fig. 13 is a schematic view of the control valve in another position.

Assuming valve 118 to be in the position in which it is shown in Fig. 11, pressure fluid is supplied to the outer ends of cylinders 43 causing the plates 22 to be moved into pressure engagement with the packages 25. With valve 118 in the position in which it is shown in Fig. 12, pressure fluid is supplied to the lower ends of the applicator cylinders 71 and the inner ends of cylinders 43. This will result in upward movement of the applicators and outward movement of the plates 22.

With the valve 118 moved to the position of Fig. 13, pressure fluid is supplied to the upper ends of the applicator cylinders 71 and the outer ends of cylinders 43. However, pressure in these latter cylinders is ineffective to move the plates until the applicators have returned to normal lowermost position where they engage trip levers 130, causing latches 131 to disengage catches 132, permitting inward movement of the plates into pressure engagement with the packages.

In the operation of the machine, assuming that the machine is empty and that the valve 118 is in the position in which it is shown in Fig. 12, pressure fluid will be supplied to the lower ends of the applicator cylinders 71 and the inner ends of cylinders 43, the plates being spread apart or expanded and latched in expanded position by latches 131. The machine is then ready to be charged with packages of food which may be conveyed to the upper ends of spaces between plates in any suitable manner. Valve 118 is then turned to the position in which it is shown in Fig. 13, supplying pressure fluid to the upper ends of the applicator cylinders, causing the applicators to descend to their lowermost position, such as shown in Fig. 11. As the applicators descend they act as elevators for lowering the packages into position between the plates. In moving down, the applicators also act to remove slush and previously applied anti-icing fluid to leave a clean freezing surface for the packages. When the applicators have reached their lowermost position they actuate trip levers 130, releasing latch 131, and since the outer ends of the cylinders 43 are provided with pressure fluid through pipe 122, the outer plates 22 are moved inwardly against the packages to place them under pressure between the plates. The freezing cycle then commences and during this cycle the valve may be turned to the position in which it is shown in Fig. 11 to relieve stress on the applicator pistons and cylinders.

After the food in the packages has been frozen the valve 118 may be moved to the position in which it is shown in Fig. 13 to supply fluid to the inner ends of the cylinders 43 and the lower ends of applicator cylinders 71. The applicators will then move upwardly, serving to free the packages from the machine and elevate and discharge the same from the upper ends of the spaces between the plates. In this connection, it may be pointed out that preferably the cylinders 71 and their pistons 70 are so constructed that a greater force is caused to bear against the packages to move them out of the plates in a direction to shear any frozen adhesions between packages and plates than is caused to separate the plates. During upward movement of the applicators the distributor pipe is supplied with anti-icing fluid in the manner heretofore described, which is sprayed on the surfaces of the plates. During upward movement of the applicators the lower and more flexible wiper 77 of each serves to evenly spread the anti-icing fluid over the surfaces of the plates. When the applicators have reached their uppermost position, and before descending, it is preferable to wait a short interval of time to permit the anti-icing fluid to act upon any frost or ice that may be present to convert the same to slush or melt it before loading the machine again. When this period has passed the operations may be repeated to again load the machine, and during downward movement of the applicators the upper stiffer wiper 78 of the applicator serves to remove the anti-icing fluid and any slush from the plates.

Although the invention has been particularly shown and described, it is contemplated that various changes and modifications may be made without departing from the scope of the invention as indicated by the following claims.

I claim:

1. A machine for the sharp freezing of food in packages comprising freezing plates disposed in parallel spaced relation and providing spaced parallel highly heat conductive freezing surfaces between which packages of food to be frozen are received, means for refrigerating said plates, an anti-icing fluid applicator member mounted for movement between each pair of plates, and means for supplying said applicator members with anti-icing fluid during movement thereof in one direction, said applicator having a wiper for removing anti-icing fluid and slush from said plates during movement in the opposite direction.

2. A machine for the sharp freezing of food in packages comprising vertically disposed freezing plates disposed in horizontally spaced relation and providing spaced vertical highly heat conductive freezing surfaces between which packages of food to be frozen are received, means for refrigerating said plates, an anti-icing fluid applicator member mounted for vertical movement between each pair of plates, and means for supplying said applicator members with anti-icing fluid during movement thereof in one direction, said applicator having a wiper for removing anti-icing fluid and slush from said plates during movement in the opposite direction.

3. A machine for the sharp freezing of food in packages comprising vertically disposed freezing plates disposed in horizontally spaced relation and providing spaced vertical highly heat conductive freezing surfaces between which packages of food to be frozen are received, means for refrigerating said plates, an anti-icing fluid applicator member mounted for vertical movement between each pair of plates, a package supporting surface on the upper edge of said applicator member extending substantially the length of said plates, means for raising and lowering said applicator members, and means for supplying said applicator members with anti-icing fluid during upward movement thereof, said applicators each having a wiper for removing anti-icing fluid and slush from said plates during downward movement.

4. A machine for the sharp freezing of food in packages comprising vertically disposed freezing plates disposed in horizontally spaced relation and providing spaced vertical highly heat conductive freezing surfaces between which packages of food to be frozen are received, means for refrigerating said plates, anti-icing fluid applicator members mounted for vertical movement between said plates, said members being adapted to support packages of food to be frozen, the rigid portions of said members being of less width than said packages, means for raising and lowering said applicator members for loading and unloading packages from said machine, means for supplying said applicator members with anti-icing fluid during upward movement thereof, said applicator members including a wiper for removing fluid and slush from the surfaces of said plates during downward movement of said members, and means for moving the outer of said plates laterally inward when said applicator members are in normal lowered position.

5. A machine for the sharp freezing of food in packages comprising vertically disposed plates presenting oppositely disposed surfaces between which packages of food may be disposed, an elevator member adapted for vertical movement in each space between plates, said members being narrower than the width of the packages and being adapted to support a plurality of packages for loading and unloading thereof, means for raising and lowering said elevators, and means cooperatively associated with said raising and lowering means for moving said plates laterally into and out of pressure engagement with said packages.

6. In a machine for the sharp freezing of food in packages, a frame, a pair of vertically disposed plates constructed and arranged to be refrigerated and presenting opposed surfaces between which the packages of food may be disposed, means mounting said plates on said frame for limited vertical movement thereof, and an elevator member constructed and arranged for vertical movement between said plates for loading and unloading packages.

7. In a machine for the sharp freezing of food in packages, a frame, a pair of vertically disposed plates constructed and arranged to be refrigerated and presenting opposed surfaces between which the packages of food may be disposed, means resiliently suspending said plates on said frame, and an elevator member constructed and arranged for vertical movement between said plates for loading and unloading packages.

8. In a machine for the sharp freezing of food in packages, means providing a conduction freezing surface with which the packages may be brought into contact for freezing the contents, means for refrigerating said surface, means for periodically applying an anti-icing fluid to said surface, said means comprising an applicator constructed and arranged to traverse said surface, power means for actuating the applicator, and means for supplying the applicator with anti-icing fluid.

9. In a machine for the sharp freezing of food in packages, a frame, a pair of vertically disposed plates constructed and arranged to be refrigerated and presenting opposed surfaces between which the packages of food may be disposed mounted on said frame for movement laterally toward and away from each other, an elevator member constructed and arranged for vertical movement between said plates, means for raising and lowering said elevator member, means for moving said plates laterally, and coordinating means constructed and arranged to operate the elevator raising and lowering means and the plate moving means in timed relation through a cycle of operation.

10. In a machine for the sharp freezing of food in packages, a frame, a pair of vertically disposed plates constructed and arranged to be refrigerated and presenting opposed surfaces between which the packages of food may be disposed mounted on said frame for movement laterally toward and away from each other, an elevator member constructed and arranged for vertical movement between said plates, hydraulic means for raising and lowering said elevator member, including a piston and cylinder means supporting said elevator, hydraulic means for moving said plates laterally, including a piston and cylinder means and linkage means connecting same with said plates, and coordinating means constructed and arranged to operate the elevator raising and lowering means and the plate moving means in timed relation through a cycle of operation.

11. In a refrigerating machine, a pair of spaced refrigerating plates providing opposed surfaces for engaging therebetween a package to be frozen, means mounting the plates for relative lateral and limited vertical movement, and package supporting means mounted for vertical movement between said plates and relative thereto.

12. In a refrigerating machine, a body, three vertically arranged refrigerated plates, including a center plate and two outer plates, mounted on the body in spaced parallel relationship for relative lateral movement and defining article-receiving spaces therebetween, article-supporting members carried by the body for vertical movement relative to the plates, one in each of said spaces, means operatively associated with the outer plates to move them laterally towards and away from the center plate, and means operatively associated with the article-supporting members to move them vertically in said respective spaces.

ISAAC H. POLK.

REFERENCES CITED

The following references are of record in the file of this patent:

UNITED STATES PATENTS

| Number | Name | Date |
| --- | --- | --- |
| 175,291 | Lount | Mar. 28, 1876 |
| 1,527,562 | Kolbe | Feb. 24, 1925 |
| 1,817,890 | Birdseye | Aug. 4, 1931 |
| 1,822,089 | Hall | Sept. 8, 1931 |
| 1,928,755 | Hall | Oct. 3, 1933 |
| 1,977,373 | Birdseye | Oct. 16, 1934 |
| 1,998,431 | Birdseye | Apr. 23, 1935 |
| 2,029,175 | Limpert | Jan. 28, 1936 |
| 2,076,770 | Dowell | Aug. 13, 1937 |
| 2,124,110 | Hall | July 19, 1938 |
| 2,145,308 | Jordan | Jan. 31, 1939 |
| 2,315,768 | Burnette | Apr. 6, 1943 |
| 2,436,390 | Kleist | Feb. 24, 1948 |